United States Patent [19]

Maschberger et al.

[11] 4,230,820

[45] Oct. 28, 1980

[54] PROCESS FOR THE PREPARATION OF ORGANOPOLYSILOXANE FOAMS

[75] Inventors: Adolph Maschberger, Burghausen; Peter August, Seeveta, both of Fed. Rep. of Germany

[73] Assignee: Wacker-Chemie GmbH, Munich, Fed. Rep. of Germany

[21] Appl. No.: 16,761

[22] Filed: Mar. 2, 1979

[30] Foreign Application Priority Data

Mar. 14, 1978 [DE] Fed. Rep. of Germany ....... 2810921

[51] Int. Cl.³ .............................. C08J 9/00; C08J 9/02
[52] U.S. Cl. ................................. 521/77; 260/37 SB; 521/91; 521/96; 521/99; 521/122; 521/154; 528/24; 528/31; 528/33; 528/901; 525/474
[58] Field of Search ...................... 528/901, 11, 33, 24, 528/31; 260/37 SB; 521/154, 122, 99, 91, 96, 97

[56] References Cited

U.S. PATENT DOCUMENTS

| | | | |
|---|---|---|---|
| 3,428,580 | 2/1969 | Nitzche et al. | 528/31 |
| 3,677,981 | 7/1972 | Wada | 528/31 |
| 3,923,705 | 12/1975 | Smith | 528/31 |
| 4,024,091 | 5/1977 | Lee et al. | 528/31 |
| 4,026,843 | 5/1977 | Kittle | 521/154 |
| 4,108,833 | 8/1978 | Hatanaka et al. | 528/31 |

FOREIGN PATENT DOCUMENTS 909052 10/1962 United Kingdom ...................... 528/31

*Primary Examiner*—Morton Foelak

[57] ABSTRACT

Organopolysiloxane foams are prepared by heating a mixture containing (A) a diorganopolysiloxane, (B) silicon dioxide having a surface area of at least 50 $m^2/g$, (C) a peroxide compound, (D) at least one organosilicon compound containing at least 2 weight percent of Si-bonded hydroxyl groups and (E) at least one organopolysiloxane having Si-bonded hydrogen, to a temperature between 280° and 320° C. at a pressure which does not exceed the pressure of the surrounding atmosphere.

5 Claims, No Drawings

PROCESS FOR THE PREPARATION OF ORGANOPOLYSILOXANE FOAMS

The present invention relates to organopolysiloxane foams and more particularly to a process for preparing organopolysiloxane foams.

BACKGROUND OF THE INVENTION

Organopolysiloxane foams and processes for preparing the same are well known in the art. For example U.S. Pat. No. 4,024,091 to Lee et al disclose a process for preparing a silicone sponge by heating a composition containing a polydiorganosiloxane gum base stock, a hydroxylated organosiloxane, a siloxane having silicon-bonded hydrogen atoms and a platinum catalyst to a temperature about 125° C.

Berridge discloses in U.S. Pat. No. 2,857,343, the formation of foams using external blowing agents such as dinitrosopentamethylenetetramine and N,N'-dimethyl N,N'-dinitrosoterephthalamide in combination with two peroxide catalysts.

Wada et al. disclose in U.S. Pat. No. 3,677,981 a heat activated foamable organopolysiloxane composition containing a diorganopolysiloxane gum having from 0.025 to 0.25 mols of vinyl group, a diorganopolysiloxane having a viscosity of at least 10 cs at 25° C. and having at least ten times as many mols of vinyl group as the gum, an organohydrogenpolysiloxane in such an amount that the SiH linkages are from 50 to 200 mol percent of the total vinyl groups and there are at least three SiH per molecule, silica, a platinum catalyst and a blowing agent such as azobisisobutylronitrile.

Smith describes in U.S. Pat. No. 3,923,705 a composition which can be foamed at room temperature containing an organohydrogensiloxane having an average of at least three silicon-bonded hydrogen atoms per molecule, a hydroxylated organosiloxane having an average of from 1.0 to 2.5 silicon-bonded hydroxyl groups per molecule, a platinum catalyst, a benzene-soluble vinyl containing triorganosiloxy end-blocked polydiorganosiloxane having an average of about two vinyl radicals per molecule and a filler material.

Compared to processes described heretofore for the preparation of organopolysiloxane foams, the process of this invention does not require the addition of external organic blowing agents, such as dinitrosopentamethylenetetramine, which often forms toxic by-products and/or produces foams having unpleasant odors, objectionable coloring and/or unsatisfactory mechanical strength. Moreover, many of the foam compositions described in the prior art were unstable and once the ingredients were mixed, they had to be used within a short period of time. In contrast to the foam compositions described heretofore, the compositions used in the process of this invention are stable where stored for a period of time.

British Pat. No. 909,052 describes heating a composition containing a diorganopolysiloxane, silicon dioxide, a peroxide compound, an organosilicon compound containing Si-bonded hydroxyl groups and an organopolysiloxane containing Si-bonded hydrogen to a maximum of 250° C. However, at this temperature, the composition does not generate a foam.

Surprisingly it has been found that organopolysiloxane foams could be prepared which are free of the undesirable properties such as toxic by-products, unpleasant odors and objectionable coloring and still have satisfactory mechanical strength.

Therefore, it is an object of this invention to provide an organopolysiloxane foam. Another object of this invention is to provide a process for preparing an organopolysiloxane foam in the absence of external organic blowing agents. Still another object of this invention is to provide an organopolysiloxane foam which is free of unpleasant odors. A further object of this invention is to provide an organopolysiloxane foam which is free of undesirable coloring.

SUMMARY OF INVENTION

The foregoing objects and others which will become apparent from the foregoing description are accomplished in accordance with this invention, generally speaking, by providing a process for preparing organopolysiloxane foams which comprises heating a mixture containing (A) a diorganopolysiloxane capable of being cross-linked with a peroxide compound, (B) a silicon dioxide having a surface area of at least 50 m²/g, (C) a peroxide compound, (D) at least one organosilicon compound containing at least 2 weight percent of Si-bonded hydroxyl groups and (E) at least one organopolysiloxane containing Si-bonded hydrogen, to a temperature of from 280° to 320° C. at a pressure which does not exceed that of the surrounding atmosphere.

DETAILED DESCRIPTION OF THE INVENTION

Any diorganopolysiloxane (A) which is capable of being cross-linked with peroxide compounds can be used in the process of this invention. These diorganopolysiloxanes are generally represented by the general formula:

$$Z_nSiR_{3-n}O(SiR_2O)_xSiR_{3-n}Z_n,$$

in which R represents the same or different, monovalent hydrocarbon radicals and substituted monovalent hydrocarbon radicals, Z represents hydroxyl groups and/or hydrocarbonoxy groups having from 1 to 16 carbon atoms, n is 0 or 1, and x is a number having a value which corresponds to a viscosity of at least 500,000 mPa·s.

It is preferred that n have a value of 1 and that Z represent a hydroxyl group.

Although this is generally not indicated in the above formula, the diorganopolysiloxanes may contain within or along the siloxane chain siloxane units other than the diorganosiloxane units (SiR$_2$O). Examples of such other siloxane units which may be present generally as impurities are siloxane units corresponding to the following formulas: $RSiO_{3/2}$, $R_3SiO_{1/2}$ and $SiO_{4/2}$, where R is the same as above. However it is preferred that siloxane units other than diorganosiloxane units be less than 1 mol percent.

Examples of monovalent hydrocarbon radicals represented by R are alkyl radicals, such as methyl, ethyl, propyl, butyl, hexyl and octadecyl radicals; alkenyl radicals, such as vinyl, alyl, ethylallyl and butadienyl radicals; aryl radicals, such as the phenyl radical; alkaryl radicals, such as the tolyl radicals; and aralkyl radicals such as the beta-phenylethyl radical.

Examples of substituted monovalent hydrocarbon radicals represented by R are halogenated aliphatic hydrocarbon radicals, such as the 3,3,3,-trifluoropropyl radical.

Because of their availability, it is preferred that at least 80 percent of the number of R radicals present be methyl radicals. Furthermore, it is preferred that any other R radicals present be free of aliphatic unsaturation and more preferably that they be phenyl radicals.

The value of x is preferably so high that the viscosity of the diorganopolysiloxanes is at least $10^6$ mPa·s at 25° C., or at least sufficiently high that the diorganopolysiloxanes have a value of from 50 to 1000 mkp and more preferably from 150 to 800 mkp, as measured in a Brabender plastograph at 25° C. and at 60 rpm. If desired, mixtures of various diorganopolysiloxanes may be used.

The surface area of the silicon dioxide (B) should be at least 50 $m^2/g$. The upper limit for the surface area of the silicon dioxide is not critical. It is preferred that the surface area be from 125 to 600 $m^2/g$, and more preferably from 130 to 400 $m^2/g$. The surface area of the silicon dioxide is determined by nitrogen absorption in accordance with the method described in ASTM Special Technical Publication No. 51, 1941 page 95 (BET Method). Pyrogenically produced silicon dioxide is the preferred silicon dioxide having a surface area of at least 50 $m^2/g$. If desired, it is possible to employ silicic acid hydrogel which has been dehydrated while maintaining its structure, as well as other precipitated silicon dioxides having a surface area of at least 50 $m^2/g$.

If desired, mixtures of various types of silicon dioxides having a surface area of at least 50 $m^2/g$ may be employed.

At least a portion of the silicon dioxide having a surface area of at least 50 $m^2/g$ as well as a portion of any filler used may have organosilyl groups on its surface. For example a portion of the silicon dioxide having a surface area of at least 50 $m^2/g$ and/or any other filler may be pretreated with, for example, trimethylchlorosilane in accordance with the procedure described in German Patent Application 2,211,377.

It is preferred that the silicon dioxide having a surface area of at least 50 $m^2/g$ be employed in an amount of from 15 to 80 parts by weight for each 100 parts by weight of the diorganopolysiloxane (A).

Any peroxide compound (C) which could have been used heretofore for cross-linking diorganopolysiloxanes may be used in the process of this invention. Examples of such peroxide compounds are acyl peroxides, for example dibenzoylperoxide, bis-(4-chlorobenzoyl)-peroxide and bis-(2,4-dichlorobenzoyl)-peroxide; alkylperoxides and arylperoxides, such as di-tert-butylperoxide and dicumylperoxide; perketales, such as 2,5-bis-(tert-butylperoxy)-2,5-dimethylhexane; as well as peresters, such as diacetylperoxydicarbonate, tert-butylperbenzoate and tert-butyl-peroxyisopropylcarbonate. The acylperoxides are the preferred peroxide compounds.

It is preferred that the peroxide compounds be used in an amount of from 0.2 to 3 parts by weight per 100 parts by weight of the diorganopolysiloxane.

Organosilicon compounds (D) containing at least 2 percent by weight of Si-bonded hydroxyl groups which could have been used in combination with organopolysiloxanes having Si-bonded hydrogen to form elastomeric and non-elastomeric organopolysiloxanes can be used in the process of this invention to form organopolysiloxane foams. The SiC-bonded organic radicals in the organosilicon compounds containing at least 2 percent by weight of Si-bonded hydroxyl groups, may be the same radicals as those previously cited for the R radicals. Methyl and phenyl radicals are the preferred SiC-bonded organic radicals in the organosilicon compounds containing at least 2 percent by weight of Si-bonded hydroxyl groups. The silicon valences of the silicon atoms in the organosilicon compounds containing at least 2 percent by weight of Si-bonded hydroxyl groups, which are not satisfied by such radicals and hydroxyl groups, are preferably satisfied by siloxane oxygen atoms. Moreover, it is preferred that the organosilicon compounds containing at least 2 percent by weight of Si-bonded hydroxyl groups per molecule, have on the average at least 2 Si-bonded hydroxyl groups. Furthermore, it is preferred that the organosilicon compounds containing at least 2 percent by weight of Si-bonded hydroxyl groups have a maximum of 9.2 percent by weight and more preferably about 5 percent by weight of Si-bonded hydroxyl groups. These organosilicon compounds containing at least 2 percent by weight of Si-bonded hydroxyl groups may be linear, cyclic or branched.

The organosilicon compounds (D) containing at least 2 percent by weight of Si-bonded hydroxyl groups may for example be dimethylpolysiloxanes having an Si-bonded hydroxyl group in each of their terminal units; copolymers of dimethylsiloxane are phenylmethylsiloxane units having an Si-bonded hydroxyl group in each terminal unit; copolymers of monomethylsiloxane and dimethylsiloxane units having Si-bonded hydroxyl groups; phenylmethylpolysiloxanes having an Si-bonded hydroxyl group in each of their terminal units; 2,4,6,8-tetramethyl-2,4,6,8-tetrahydroxycyclotetrasiloxane and mixtures of dimethylpolysiloxanes having an Si-bonded hydroxyl group in each of their terminal units, and diphenylsilane diol, as well as trimethylsilanol.

It is preferred that the amount of organosilicon compounds (D) containing at least 2 percent by weight of Si-bonded hydroxyl groups be from 2 to 20 parts by weight per 100 parts by weight of the diorganopolysiloxane (A).

Any organopolysiloxanes (E) containing Si-bonded hydrogen, which could have been used heretofore in combination with an organosilicon compound having Si-bonded hydroxyl groups in preparing elastomeric and non-elastomeric organopolysiloxane foams may be used in the process of this invention to form organopolysiloxane foams. Except for radicals having aliphatic unsaturation, the SiC-bonded organic radicals in the oranopolysiloxanes having Si-bonded hydrogen may be the same as the R radicals which have previously been described. It is preferred that the organopolysiloxanes (E) containing Si-bonded hydrogen have on the average at least 3 Si-bonded hydrogen atoms per molecule. Furthermore it is preferred that they contain at least 0.01 percent by weight and more preferably at least 1 percent by weight but no more than about 1.67 percent by weight of Si-bonded hydrogen. The organopolysiloxanes having Si-bonded hydrogen may also be linear, cyclic or branched. They may also contain the following siloxane units: $RSiO_{3/2}$, $R_2SiO$, $R_3SiO_{\frac{1}{2}}$, $RHSiO$, $HSiO_{3/2}$, $R_2HSiO_{\frac{1}{2}}$, $H_2SiO$, $RH_2SiO_{\frac{1}{2}}$ and $SiO_{4/2}$, with the proviso that for each molecule at least one and more preferably three R radicals be present and that at least one and more preferably at least three Si-bonded hydrogen atoms be present. In the above siloxane units, R is the same as described previously, except that R cannot represent a radical having aliphatic unsaturation.

The organopolysiloxanes having Si-bonded hydrogen may for example be cyclic methylhydrogenpolysiloxanes such as 2,4,6,8-tetramethylcyclotetrasiloxane, trimethylsiloxy end-blocked methylhydrogenpolysiloxane copolymers of trimethylsiloxane, dimethylsiloxane and methylhydrogensiloxane units, copolymers of dimethylhydrogensiloxane and methylhydrogensiloxane units, as well as copolymers of dimethylhydrogensiloxane, dimethylsiloxane and methylhydrogensiloxane units. It is preferred that the organopolysiloxanes (E) having Si-bonded hydrogen have a viscosity of 10 to 300 mPa·s at 25° C.

It is preferred that the organopolysiloxanes (E) having Si-bonded hydrogen be employed in the process in an amount of from 0.5 to 50 parts by weight for each 100 parts by weight of the diorganopolysiloxane (A).

In addition to the diorganopolysiloxanes (A), the silicon dioxide (B) having a surface area of at least 50 m$^2$/g, a peroxide compound (C), an organosilicon compound (D) containing at least 2 percent by weight of Si-bonded hydroxyl groups and an organopolysiloxane (E) having Si-bonded hydrogen, it is possible to employ such additional substances as have been used heretofore in the preparation of organopolysiloxane elastomers which have been cross-linked with the aid of a peroxide compound. Examples of such substances which may also be employed are reinforcing fillers other than silicon dioxide having a surface area of at least 50 m$^2$/g, non-reinforcing fillers, pigments, soluble dyes, agents which influence electrical properties, such as conductive carbon black, corrosion inhibitors, oxidation inhibitors, heat stabilizers, flameproofing materials, agents which impede efflorescence and materials which serve to reduce deflection under a constant pressure.

Examples of reinforcing fillers other than silicon dioxide having a surface area of at least 50 m$^2$/g are pyrogenically prepared aluminum oxide and pyrogenically produced titanium dioxide.

Examples of non-reinforcing fillers, i.e., fillers having a surface area of less than 50 m$^2$/g, are for example quartz meal, diatomaceous earth, siliceous chalk, such as Neuburg Chalk, calcium silicate, zirconium silicate and calcium carbonate, for example in the form of ground chalk and of calcinated aluminum silicate. Fibrous fillers such as asbestos and/or glass fibers may also be employed. Although this is not particularly desirable, organic blowing agents should not be excluded from these compositions. Examples of organic blowing agents which may be used are azoisobutyric acid nitrile, dinitrosopentamethylenetetramine, benzenesulfonic acid hydrazide, N,N'-dinitroso-N,N'-dimethylterephthalic acid diamide, p,p'-oxybis-(benzenesulfonic acid hydrazide), terephthalic acid azide or azodicarbonamide.

The process of this invention is preferably carried out at the pressure of the surrounding atmosphere, i.e. at 1 bar or at about 1 bar. However, if desired, lower pressures, for example 0.5 bar, may be used as well.

In order to prevent cross-linking prior to the formation of the foam, it is preferred that the composition be heated to a temperature of from 280° to 320° C. as rapidly as possible. Moreover, it is preferred that the composition be heated to this temperature range in from 1 to 5 minutes.

The process of this invention may be carried out batchwise, as a semi-continuous process or as a continuous process.

The elastomeric organopolysiloxane foams prepared in accordance with this invention may be used for all purposes for which organopolysiloxane foams have been previously employed. For example, they may be used for thermal insulation, as sealing and sound-proofing in buildings, vehicles, ships and aircraft.

In the following examples all parts and percentages are by weight unless otherwise specified.

EXAMPLE 1

About 100 parts of a mixture containing 100 parts of a dimethylpolysiloxane having one Si-bonded hydroxyl group in each of its terminal units and which has a 520 mkp value at 25° C. and at 60 rpm as determined in a Brabender plastograph, 34 parts of pyrogenically produced silicon dioxide having a surface area of 148 m$^2$/g, and 5 parts of a dimethylpolysiloxane having 1 Si-bonded hydroxyl group in each of its terminal units and containing 3.9 percent Si-bonded hydroxyl groups are first mixed with a mixture containing 1 part of a trimethylsiloxy end-blocked methylhydrogenpolysiloxane which has a viscosity of 38 mPa at 23° C., and 1.61 percent of Si-bonded hydrogen and 0.6 part of pyrogenically produced silicon dioxide having a surface area of 148 m$^2$/g and then with 2 parts of dibenzoylperoxide.

Two days after the substances have been mixed, a specimen of the mixture is rolled into a 1 cm thick sheet, heated for 5 minutes to 300° C. at atmospheric pressure and then heated for an additional 2 hours in an air circulating oven to 200° C.

Another specimen of the mixture is stored for 3 months at room temperature. After three months have elapsed, the second specimen is also rolled into a 1 cm thick sheet, heated for 5 minutes at 300° C. at atmospheric pressure and subsequently heated in an air circulating oven at 200° C. for 2 hours.

EXAMPLE 2

The procedure described in Example 1 is repeated, except that a mixture containing 2 parts of the same organopolysiloxane having Si-bonded hydrogen and 1.2 parts of the same pyrogenically produced silicon dioxide is substituted for the mixture containing 1 part of the organopolysiloxane having Si-bonded hydrogen and 0.6 part of pyrogenically produced silicon dioxide.

EXAMPLE 3

The procedure described in Example 1 is repeated, except that a mixture containing 3 parts of the same organopolysiloxane having Si-bonded hydrogen and 1.8 parts of the same pyrogenically produced silicon dioxide is substituted for the mixture containing 1 part of the organopolysiloxane having Si-bonded hydrogen and 0.6 part of the pyrogenically produced silicon dioxide.

EXAMPLE 4

The procedure described in Example 1 is repeated, except that a mixture containing 4 parts of the same organopolysiloxane having Si-bonded hydrogen and 2.4 parts of the same pyrogenically produced silicon dioxide is substituted for the mixture containing 1 part of the organopolysiloxane having Si-bonded hydrogen and 0.6 part of the pyrogenically produced silicon dioxide.

EXAMPLE 5

The procedure described in Example 1 is repeated, except that a mixture of 5 parts of the same organopolysiloxane having Si-bonded hydrogen and 3.0 parts of the same pyrogenically produced silicon dioxide is substituted for the mixture containing 1 part of the organopolysiloxane having Si-bonded hydrogen and 0.6 part of the pyrogenically produced silicon dioxide.

The organopolysiloxane foams prepared in accordance with Examples 1 through 5 are odorless and even after heating for 2 hours at 200° C., they remain colorless. The specific weights of the elastomeric organopolysiloxane foams prepared in accordance with Examples 1 through 5 are shown in the following table.

TABLE

| Example | Specific weight (g/cm$^3$) of the foam | |
|---|---|---|
| | Two days after preparation | Three months after preparation |
| 1 | 0.52 | 0.56 |
| 2 | 0.50 | 0.50 |
| 3 | 0.47 | 0.44 |
| 4 | 0.43 | 0.43 |
| 5 | 0.40 | 0.41 |

What is claimed is:

1. A process for the preparation of organopolysiloxane foams which comprises rapidly heating a mixture consisting essentially of (A) a diorganopolysiloxane having terminal groups selected from the group consisting of hydroxyl groups, hydrocarbonoxy groups and mixtures thereof and having a viscosity of at least 500,000 mPa.s at 25° C., (B) a pyrogenically produced silicon dioxide having a surface area of at least 50 m$^2$/g, (C) a peroxide compound, (D) 2 to 20 parts by weight per 100 parts of diorganopolysiloxane (A) of an organopolysiloxane containing at least 2 and up to 9.2 weight percent of Si-bonded hydroxyl groups and (E) at least one organopolysiloxane containing Si-bonded hydrogen, to a temperature of from 280° to 320° C. at a pressure which does not exceed that of the surrounding atmosphere.

2. The process of claim 1, wherein the organopolysiloxane (E) contains at least 0.01 percent by weight of Si-bonded hydrogen and is present in an amount of from 0.5 to 50 parts by weight of diorganopolysiloxane (A).

3. The process of claim 1, wherein the organopolysiloxane (E) contains from 0.01 to 1.67 percent by weight of Si-bonded hydrogen.

4. The process of claim 1, wherein the diorganopolysiloxane (A) is represented by the formula $$A_nSiR_{3-n}O(SiR_2O)_xSiR_{3-n}Z_n$$

in which R is selected from the group consisting of monovalent hydrocarbon radicals and halogenated monovalent hydrocarbon radicals, Z is selected from the group consisting of hydroxyl groups, hydrocarbonoxy groups and mixtures thereof, n is 1 and x has a value which corresponds to a viscosity of at least 500,000 mPa·s at 25° C.

5. The process of claim 1, wherein the mixture is heated to at least 280° C. within 1 to 5 minutes.

* * * * *